United States Patent [19]

Bush et al.

[11] Patent Number: 5,496,873
[45] Date of Patent: Mar. 5, 1996

[54] POLYMERIC COMPOSITIONS

[75] Inventors: Stephen F. Bush, Poynton; James M. Methven, Moreton; David R. Blackburn, Withington, all of United Kingdom

[73] Assignee: Scott Bader Co., Ltd., United Kingdom

[21] Appl. No.: 293,084

[22] Filed: Aug. 19, 1994

Related U.S. Application Data

[63] Continuation of Ser. No. 61,823, May 13, 1993, abandoned, which is a continuation of Ser. No. 542,727, Jun. 22, 1990, abandoned, filed as a continuation of PCT/GB88/01148, Dec. 23, 1988.

[30] Foreign Application Priority Data

Dec. 24, 1987 [GB] United Kingdom ............... 8730153

[51] Int. Cl.$^6$ ............................ C08L 67/06; C08L 75/16
[52] U.S. Cl. ........................ 523/508; 524/227; 525/28; 525/43; 525/49; 523/527
[58] Field of Search ................... 525/43, 49, 28, 525/454, 455, 424, 425; 523/508; 524/227

[56] References Cited

U.S. PATENT DOCUMENTS 3,994,853  11/1976  Hindersinn et al. .
4,895,895  1/1990   Osborne et al. ........................ 525/28

FOREIGN PATENT DOCUMENTS 0083837   7/1983   European Pat. Off. .
1279387   6/1972   United Kingdom .
1370138  10/1974   United Kingdom .
1445926   8/1976   United Kingdom .

OTHER PUBLICATIONS

38–Plastics Fabr. Uses, vol. 108, 1988, p. 57.
S. F. Bush, J. M. Methven & D. R. Blackburn, "Networks as the Basis of Pre–Thickening SMC", *Biological and Synthetic Polymer Networks*, pp. 321–334 (1988).

*Primary Examiner*—Patricia A. Short
*Attorney, Agent, or Firm*—Pravel, Hewitt, Kimball & Krieger

[57] ABSTRACT

A thickened organic polymeric composition useful for molding and capable of resisting post-molding shrinkage after being cross-linked comprises a cross-linkable base resin dissolved in an unsaturated monomer, and an additive resin selected from saturated polyesters and saturated amide waxes, the additive resin being crystalline at ambient temperatures and having a melting point ($T_m$) below a temperature ($T_c$) at which the base resin cross-linking reaction proceeds at a significant rate. The base resin and additive resin have only a partial degree of compatibility. When cooled from a temperature between $T_m$ and $T_c$ to a temperature between $T_m$ and ambient the composition thickens, whereas, when it is heated to a temperature below $T_c$, it reverts to a flowable composition.

16 Claims, 1 Drawing Sheet

POLYMERIC COMPOSITIONS

This is a continuation of application Ser. No. 08/061,823 filed on May 13, 1993, now abandoned, which is in turn a continuation of U.S. Ser. No. 07/542,727 filed Jun. 22, 1990, now abandoned, which is a continuation of PCT/GB8801148, filed Dec. 23, 1988 under 35 U.S.C. 120.

The present invention relates to thickened cross-linkable polymer compositions which are useful in moulding applications. The invention relates particularly but by no means exclusively to such compositions which are useful for the formulation of sheet moulding compounds, (SMC) and granular moulding compounds (GMC).

SMC is used for a number of applications and generally comprises a leather-like sheet of a cross-linkable polymer composition (also including fillers, chopped glass fibres and other ingredients as necessary) which may be relatively stiff or drapeable to fit a particular mould. The material is then subjected to compression and heating to produce the moulded article. Usually, the base polymer of the composition is an unsaturated polyester with free —COOH groups.

The fundamental requirements for any SMC, of which a typical formulation is shown in Table I below, are:

(1) It must be handleable (i.e. relatively unsticky—tack-free) at room temperature so that it can be easily cut to the requirements of a particular mould.
(2) Under prescribed pressures and temperature of moulding all the constituents of the sheet must flow to fill the mould uniformly with no segregation of the components shown in Table 1.
(3) After flowing to the edges of the mould at the prescribed temperatures, the unsaturated resin component must cross-link to give it a permanent form. It should be noted that in the formulation of Table I the unsaturated polyesters cross-link through the styrene present.

TABLE I

GENERAL PURPOSE SMC FORMULATION

| Ingredients | Composition/% by weight |
| --- | --- |
| *UNSATURATED POLYESTER DISSOLVED IN STYRENE MONOMER | 25 |
| *SHRINKAGE CONTROL ADDITIVE | 5 |
| *CATALYST | 0.3–0.5 |
| *FILLERS (e.g. chalk) | 40–50 |
| *RELEASE AGENT | 0.4–0.5 |
| THICKENING AGENT | 0.2–0.4 |
| GLASS (25 mm) | 25 |

Ingredients marked * are first mixed together in a high shear mixer

The formulation shown in Table I has an initial viscosity (measured at ambient temperature without the glass reinforcement) of around 200 poise (20 Pa s), while in order to achieve (1) above, industry practice suggests a requirement of around 10000 poise (1 kPa s measured under the same conditions). This viscosity is however too high to permit (2). Thus, in order to achieve both (1) and (2), two distinct steps are required:

(i) The unsaturated resin must be thickened at room temperature to obtain the desired viscosity for handling.

(ii) The viscosity must decrease sharply after placement in the mould to facilitate flow when pressure is applied.

The first step is known as "prethickening" of an SMC, and is based conventionally on the chemical reaction of residual carboxylic acid groups in the unsaturated polyester resin with oxides and hydroxides of Group II metals (typically Magnesium oxide MgO).

The manufacture of an SMC based on the composition shown in Table I consists of four basic steps:

(a) High shear mixing of the particulate fillers and the metal oxides and hydroxides into the resins.
(b) Spreading the glass fibres which are chopped in situ from rovings on to the resultant paste in the form of a sheet moving on a conveyor.
(c) Consolidation of and removal of adventitious air from the resulting fibre reinforced resin sheet; and
(d) Allowing the viscosity of the sheet to increase through slow continuation of the prethickening reaction prior to moulding.

Typically the sheet is stored for some days to allow this maturation to take place. Generally, the sheet reaches the required viscosity after about two days after commencement of the prethickening.

The effect of the chemical reaction is to create a labile network by cross-linking the polyester chains via complex metal salts. The extent of this reaction is dependent upon the level of carboxylic acid groups in the resin and this must be carefully monitored for consistent prethickening behaviour. In practice it is also found that the rate of increase and final extent of viscosity are influenced by both the particle size of the prethickening agent and the level of water in the resin. The increase in viscosity during the mixing stage (a) must not be so great that in stage (b) the fibres are insufficiently wetted by the resin. At the same time conditions and concentrations must be such that maturation is achieved in a reasonable time as indicated above.

A disadvantage of the standard thickening process referred to is that it is not readily reversible. If the prethickened paste is not added sufficiently quickly to the glass fibres in step (b) above, it may be too thick to wet these fibres sufficiently and the whole batch will be lost.

During the moulding of a SMC, the unsaturated monomer reacts in the presence of a catalyst with itself and with the unsaturated bonds of the polymer to form a permanent, covalent network in which the polymer chains are linked through bridges of a few monomer units long. Generally this cross-linking must be effected at a temperature above 100° C. to break down the bonds formed between the Group II metals and the polyester resin.

During this permanent cross-linking reaction the resin shrinks in volume by up to 10%, and unchecked this would not only reduce the fidelity with which the moulding compound reproduced the mould dimensions, but would also render the surface of the moulding compound unattractive by highlighting the presence of the reinforcing fibres.

Hitherto, control of moulding shrinkage in polyester-styrene SMCs has had to be effected by adding a solution of a thermoplastic in styrene to the SMC formulation. The solution commonly contains around 30% by weight of the thermoplastic. Appropriate thermoplastics include polystyrene, polyvinyl acetate, polycaprolactone, polymethyl methacrylate, and more recently, certain polybutadienes. Typically, the ratio of unsaturated polyester resin to the solution of thermoplastic is between 90:10 and 60:40 by weight.

An alternative to the use of Group metal oxides or hydroxides for pre-thickening an SMC formulation is disclosed in GB-A-2111513 (Scott Bader) wherein a crystalline polyester is used as the sole thickening agent. The use of such a polyester has the advantage that no maturation is required and the formulations are ready for use as soon as they have cooled. According to GB-A-2111513 it is preferred that the crystalline polyesters are unsaturated so that they may also take part in the cross-linking reaction with the vinyl monomer (e.g. stryene) during curing. Moreover, it is also preferred that (for ease of handling) the crystalline polyesters are disolved in an aromatic vinyl monomer (e.g. styrene) before being incorporated into the SMC formulation, in which case this monomer also takes part in the cross-linking reaction.

Although the crystalline polyesters disclosed in GB-A-2111513 overcome the need for a long maturation period, it is still necessary to add a thermoplastic resin to reduce or prevent shrinkage during moulding. Furthermore dissolution of the crystalline polyester in an aromatic vinyl monomer represents an additional stage in the process and, moreover, its participation in the cross-linking reaction may undesirably increase the length of the monomer bridges between the polymer chains.

SUMMARY OF THE INVENTION

It is an object of the invention to obviate or mitigate the abovementioned disadvantages.

According to a first aspect of the present invention there is provided a polymer composition comprising a cross-linkable base resin, an unsaturated monomer in which the base resin is dissolved and a saturated additive resin which by itself is crystalline at ambient temperatures with a melting point (Tm) below that temperature (Tc) at which the base resin cross-linking reaction is designed to proceed at a significant rate, said composition being such that on cooling from temperature between Tm and Tc, to a temperature between Tc and ambient the additive resin forms distributed microcrystalline domains connected severally by chains of the additive resin threading through the base resin chains, thereby producing a thickening network which may be reversibly broken down to the original additive resin molecules by heating to a temperature below Tc and which additive resin molecules swell the permanent base resin network created by the said cross-linking reactions during moulding, thereby providing resistance to post-moulding shrinkage.

According to a further aspect of the present invention there is provided a method of producing a thickened resin composition comprising heating a saturated additive resin to a temperature above its melting point (Tm), and blending the fused resin with a mixture of an unsaturated base resin and an unsaturated monomer, said mixture being at a temperature above Tm but below the temperature (Tc) at which the base resin cross-linking reaction proceeds at a significant rate, and cooling the blend to a temperature below Tm, said addition resin being such that upon cooling of the blend below Tm it forms microcrystalline domains connected severally by chains of the additive resin threading through the base resin chains so as to form a thickening network which may be reversibly broken down to the original additive resin molecules by heating to a temperature below Tc and which, is such that during cross-linking of the base resin the additive resin swells the base resin network created by the cross-linking reactions thereby providing resistance to post-moulding shrinkage.

The invention also provides a method of producing a moulded article in which the composition in accordance with the first aspect of the invention is heated to effect cross-linking of the base resin.

Thus the invention provides polymer compositions, and methods for their manufacture, which incorporate a saturated additive resin serving the dual function of thickening the polymer composition and preventing (or reducing) post moulding shrinkage without the need for additional anti-shrinkage additives. The polymer formulations of the invention may comprise reinforcement and thus are particularly useful in the formulation of sheet moulding compounds. However, the compositions will also be useful in other moulding applications where pre-thickening and anti-shrinkage properties are required. One example is injection moulding where the compositions of the invention will (by virtue of their anti-shrinkage properties) avoid the need to use high pressures for preventing the moulded article coming away from the mould. A further example is in a pultrusion technique for preparing granular moulding compounds (GMC) in which continuous fibres may be pulled through a die and coated with the polymer composition which, because it is thickened, does not drip off the fibres. The pultrudate or lace thereby made may be cut into granules, stored, and then subsequently injected or transferred to a mould where the cross-linking reaction occurs to form a moulded artefact.

The compositions of the invention may also be used as Dough Moulding Compounds.

BRIEF DESCRIPTION OF THE DRAWINGS

The invention will be further described with reference to the accompanying drawings in which.

DETAILED DESCRIPTION OF THE PREFERRED EMBODIMENTS

For the thickening effect to occur, the base and additive resins must have only a partial degree of compatibility so that on the one hand they do not form a true solution and on the other hand they are not so incompatible that near-complete segregation of the two resins occurs. Preferably the semi-compatibility corresponds to a solubility parameter difference ($\Delta\delta$) lying in the range 0.5 to 3.5 in MPa$^{1/2}$ units for resin pairs where there is no specific hydrogen bonding between the resins. More preferably still for optimum behaviour the range ($\Delta\delta$) should be 1.0 to 2.5.

The solubility parameter ($\delta$) for a polymer may be determined by a calculation based on a group contribution method, such as the one devised by Small (P. A. Small, Some Factors Affecting the Solubility of Polymers. Journal of Applied Chemistry, 3 p61, 1953). By summing the values of molar attraction constants' ($F_2$) for various parts of the polymer chains, a value for the solubility parameter ($\delta$) of the molecule can be estimated.

Values of $F_i$ can be found from Tables and are related to the solubility parameter by equation (1).

$$\delta = \frac{\Sigma F_i}{\Sigma V_i} \quad (1)$$

where $V = \epsilon V_i$ is the total volume of the polymer and $V_i$ is the volume contribution of each group.

The values of group contribution reported by different authors vary (D. W. Van Krevelen & P. J. Hoftyzer, Properties of Polymers, 2nd. Ed. Ch.8, Elsevier, Amsterdam, 1976) and it is therefore essential to use a self-consistent set of values when comparing different materials.

Figure 1:
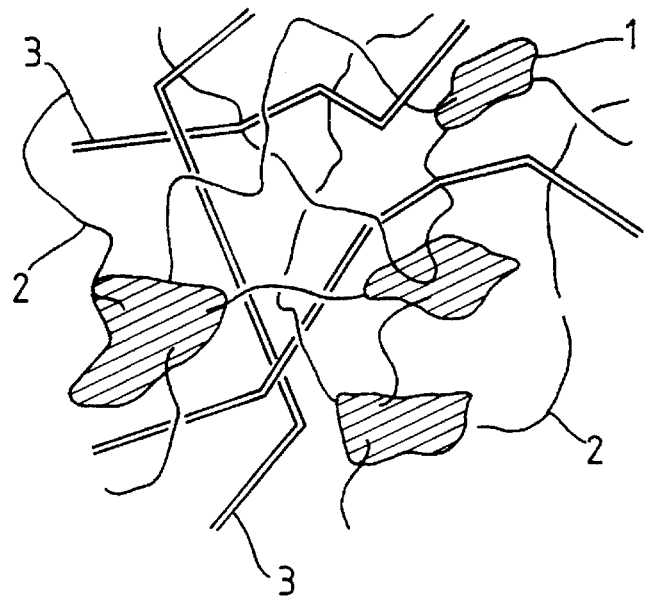
FIG. 1 is a representation of the molecular structure of a thickened resin composition in accordance with the invention.

In a situation where the base resin comprises an arrangement of different functional groups, the base resin solubility parameter may be taken to be a weighted average of those provided by the individual functional groups and the additive resin selected accordingly. However, where the base resin contains blocks of different functional groups which constitute a substantial proportion of the average oligomer chain length the invention provides for the use of several additive resins each corresponding to each long block type of the base resin.

Where the base resin contains groups likely to enter into specific interactions with an additive resin, the solubility parameter criterion may be generalised to one of requiring a partial compatibility between the base and additive resins equivalent to that de fined by the solubility parameter range ($\Delta\delta$) defined for non-specific interactions. The requirement for partial compatibility as typified by the solubility parameter difference ensures that on cooling from temperatures above Tm (the additive crystalline melting point), the crystallisation process of the additive resin which would begin to occur at Tm is hindered and constrained by the presence of the molecular chains of the base resin, so that (as shown in FIG. 1), the additive resin crystallises (i) only partially, and (ii) in the form of distributed crystallite domains 1 linked by chains 2 of the additive resin not in the crystallites, which chains are threaded by the chains of the base resin 3. The temperatures at which such crystallites are mainly formed are found to lie between ambient temperature and Tm, typically 8°–15° C. below Tm.

The degree of thickening of the base resin thereby achieved depends on (a) the proportion of additive resin used, (b) the extent of incompatibility, (c) the speed of cooling the composition from above Tm. Generally increases in (a) and (b) increase the thickening achieved by increasing the long term crystallinity up to the limit where significant segregation of the two resins in the composition is obtained. Generally increases in cooling rate may be expected to decrease the short-term thickening with only a minor effect on the long-term crystallinity obtained. This allows more efficient wetting of any reinforcing fibres present without affecting the longer term handleability of the thickened composition. As already indicated the network-forming process is reversible by heating to a temperature somewhat above that at which the crystallite nodes of the network were formed on cooling and this provides still further control over the process not present in conventionally thickened compositions.

Figure 2:
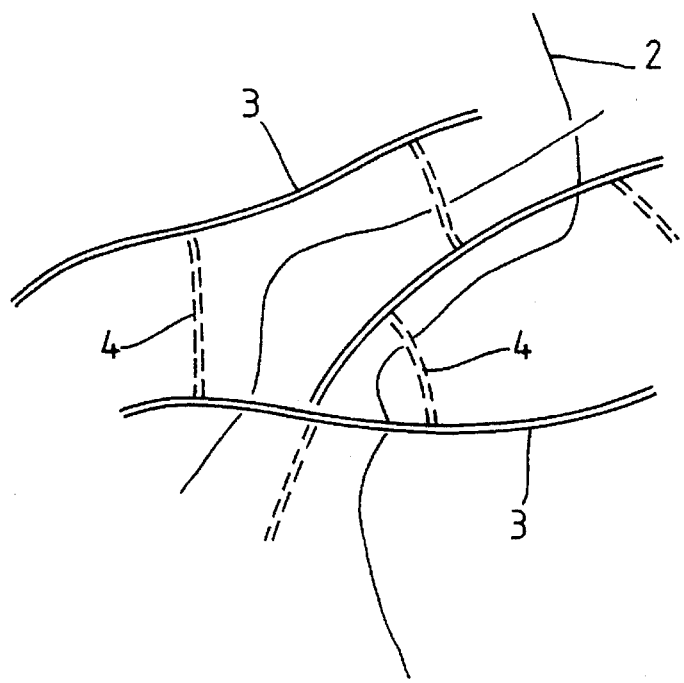
FIG. 2 is a representation of the molecular structure of the cross-linked composition.

The invention provides an important advantage at the stage where the thickened composition is moulded into a final artefact, that is when after compression and heating in a shaping die or mould to the base resin cross-linking temperature Tc, the base resin chains and the monomer molecules are linked into a permanent network. Such a network is shown in FIG. 2, in which the base resin 3 is illustrated as being cross-linked through bridges 4 derived from the unsaturated monomer. Because the additive resin is partially compatible with the base resin (but by virtue of it saturation does not take place in the cross-linking reaction), it exerts an automatic swelling pressure on a network containing the latter (FIG. 2) and this swelling pressure resists the characteristic shrinkage on cooling of the cross-linked base resin 3 for which in the conventional process (Table I) specific shrinkage control additives are provided. The degree of shrinkage control provided by this invention can be regulated by the amount of monomer forming the bridges 4 between the base resin chains 3 as well as the proportion of additive resin used in the composition. It is recognised that the proportion of additive resin will also be partly determined by the required thickening characteristics of the composition but the invention provides sufficient control parameters to achieve the required shrinkage control as well.

Furthermore, it is possible for the cross-linking reaction to be conducted an lower temperatures than in the case where an unsaturated polyester resin is thickened with a Group II metal oxide or hydroxide.

It is clear that the invention requires the additive resin as well as the base resin to be a certain minimum average number of units per chain to ensure the thickening network (FIG. 1) is adequately formed and to be a certain maximum average number of units per chain to ensure that it can be conveniently mixed with the base resin after melting at Tm. A typical minimum number of additive chain units might lie in the range 8 to 20; typical maximum number might lie in the range 20 to 40, although the invention can be used outside these ranges.

Examples of base resin which may be used are unsaturated polyester resins derived from the condensation products of unsaturated anhydrides or di-acids (e.g. maleic anhydride or fumaric acid) with diols such as ethylene glycol or di-ethylene glycol.

The unsaturated solvent for such resins may be a vinyl monomer, e.g. styrene.

Besides the use of conventional unsaturated polyester-styrene as base resin, the base resin may comprise an oligomer containing ester and urethane groups and having terminal groups of the structure:

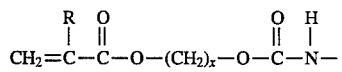

which R may be H or CH$_3$ and x is an integer less than 10 preferably 1 to 3.

Preferably, the oligomer has a number average molecular weight of 1500–3000. The oligomer may have a 'backbone' derived from a bis-phenol and an alkylene oxide. The backbone may have the following structure.

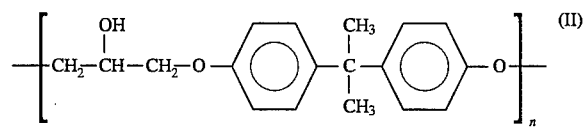

Oligomers of the above type may be dissolved in an unsaturated monomer (e.g. an acrylate such as methyl methacrylate) for use in the composition of the invention. An example base resin of this general type is available from Imperial Chemical Industries under the name MODAR.

The oligomers may be cross-linked using conventional free-radical catalysts.

The use of such urethane acrylate base resins may be expected to provide improvements in chemical resistance, end-use temperature, fire performance and moulding cycle times over that commonly found with compounds based on unsaturated polyester resins. In addition, the lower viscosity of uracrylate compared with unsaturated polyesters may be expected to result in more effective wetting contact with the reinforcing glass fibres in the compounds, and hence give improved mechanical properties. Finally, it must be realised that since uracrylates possess neither terminal nor pendant carboxylic acid residues, they cannot be prethickened by the conventional metal oxide route and are currently excluded from SMC manufacture.

Preferred additive resins for use in conjunction with the above oligomers and unsaturated polyesters include saturated polyesters, for example polyethylene adipate (PEA) and polyhexamethylene adipate (PHMA) with number average molecular weights of 1500–3000, e.g. about 2000. Both are particularly suitable as thickening resins because of their comparative cheapness.

The amount of additive resin (in relation to that of the base resin) used in the composition will depend on the degree of thickening required, the greater the amount of additive resin the greater being the thickening.

A suitable amount of additive resin may for example be 20–40% by weight that of the base resin.

The compositions of the invention may be produced by melting the additive resin and then blending the fused resin with the solution of the base resin in its monomeric solvent, this solution being at a temperature above the melting point (Tm) of the additive resin. The composition thickens on cooling below Tm and abviously any reinforcement the polymer composition should be incorporated before it cools below Tm to ensure adequate wetting.

The fact that the additive resin is used as a melt for blending with the base resin is obviously advantageous in that the need for a separate dissolution stage for the additive resin is not required. Furthermore since no separate unsaturated solvent is required for the additive resin, the length of the cross-links between the base resin chains (in the final cured product) are not disadvantageously lengthened.

As indicated previously, the compositions of the invention are particularly suitable for the formulation of (i) SMC for which purpose the composition may be admixed with the conventional additive, i.e. fillers, glass fibres etc, and then thickened by heating to produce sheet material which is used in the conventional way; (ii) granular moulding compositions (GMC) for which purpose the composition may be combined with one or more continuous strands of fibre material (e.g. glass) as a pultruded lace and then chopped into short lengths (granules).

The invention has several advantages in SMC as compared with the conventionally used resins. For example, the conventionally used polyester resins must have free —COOH groups for reaction with the Group II metal oxide to effect thickening and these resins must be manufactured consistently. In contrast the use of the additive resin in the invention for effecting thickening means that the presence of free carboxylic groups on the base resin is not required (so that consistent manufacture of the base resin is not so critical) and this opens up the possibility of using base resins with a high hydroxyl number (which may favourably influence the final properties of the moulded article) which is not possible in the case where the resin is to be thickened with a Group II metal. Additionally the thickening reaction is virtually instantaneous in comparison with the two days or so required in the conventional process and, moreover, is reversible.

This reversibility means that should the fibres not be wetted sufficiently by the resin composition, it is only necessary to reheat the composition melt some or all of the crystallites) and once again cool it.

The combination of near instaneous thickening and zero shrink in the post cross-linked state is particularly advantageous for the manufacture of granules and their subsequent moulding to shape in a mould. The thickening allows the granules to be cut from pultruded laces in the first place, while the no shrink characteristic of the moulded artefact requires only low pressures and therefore cheap moulds in the subsequent moulding stage.

The invention will be illustrated by reference to the following Examples.

EXAMPLE 1

SMC formulations were prepared using a uracrylate resin (i.e. an oligomer with terminal groups of formula I—see above) as base resin and a saturated polyester as additive resin.

The saturated polyester used in this work was a commercial grade of polyethylene adipate, (PEA) of number average molecular weight 2000. Table 2 shows the SMC formulations based on this material.

TABLE 2

POLYETHYLENE ADIPATE BASED SMC FORMULATIONS

| Material | % By Weight | | |
|---|---|---|---|
| | (a) | (b) | (c) |
| URACRYLATE RESIN DISSOLVED IN METHYL METHACRYLATE MONOMER | 29.4 | 25.7 | 22.0 |
| FILLER (Hydrocarb) | 36.4 | 36.4 | 36.4 |
| TRIGONOX (Catalyst) | 0.8 | 0.8 | 0.8 |
| ZINC STEARATE (Mould Release Agent) | 1.1 | 1.1 | 1.1 |
| POLYETHYLENE ADIPATE | 7.3 | 11.0 | 14.7 |
| GLASS MAT | 25.0 | 25.0 | 25.0 |

Since the PEA is a solid at ambient temperature with a melting point of around 50° C., it was first melted and blended with the Uracrylate resin/filler combination, and the resulting mixture spread onto the appropriate quantity of chopped strand glass mat kept at this temperature by means of a hot table. The SMC so prepared was then allowed to cool to ambient temperature between sheets of polythene and cellophane.

PEA was chosen since its solubility parameter of 20 $(MPa)^{1/2}$ is within the prescribed distance from that estimated for the uracrylate (20.7 $(MPa)^{1/2}$), The results of adding PEA to the uracrylate resin were found to transform a resin with a viscosity of around 1 poise (0.1 Pa s) to a coherent but malleable sheet of perhaps 100000 poise (10 kPa s) at ambient temperature. As expected, over the range of additive proportions applied, the greater the proportion of additive to resin, the stiffer the sheet. In all cases a satisfactory prethickening was obtained. When the PEA was replaced with an additive resin poly-(hexamethylene adipate) PHMA having a somewhat lower solubility parameter, thus increasing the incompatibility with the base resin, then as referred to above, the thickening effect was enhanced or alternatively the same thickening was obtained at lower proportions of additive resin. Generally, it is also found that the tackiness of the thickened sheet decreases at greater degrees of incompatibility (up to the limit prescribed by the invention).

The addition of PEA to the uracrylate resin resists shrinkage during the formation of the cross-linked resin network. This arises because the similarity of the solubility parameters for the PEA and uracrylate ensures that the molten PEA will swell the network at reaction temperatures (of about 140 ° C). On cooling to room temperature, the network will interfere with any PEA crystallisation, thereby maintaining the swelling pressure, which in turn offsets the shrinkage pressure. Such is found to be the case. In fact with the proportions of Table 2 a small nett expansion was found on cooling.

EXAMPLE 2

To further explore the basic concept, PEA and PHMA were added in controlled proportions to a standard unsaturated polyester typically used in SMC manufacture (Table 3). The solubility parameter differences were estimated at 2 and 2.3 respectively that is within the preferred range but greater than that applying to Example 1.

TABLE 3

| Material | % By weight |
| --- | --- |
| Polyester-styrene | 32 |
| Filler (Hydrocarb) | 30 |
| Trigonox | .8 |
| Zinc Stearate | 2.2 |
| PEA or PHMA | 10 |
| Glass Mat | 25 |

The resulting sheets were (a) much stiffer than those in Example 1 (the uracrylate resin) and (b) as expected PHMA was stiffer but less tacky than PEA.

The invention thus provides a new general class of thickenable moulding compositions giving particular advantage in the preparation of sheet moulding compounds (SMC). The invention is not restricted to this class of composition however but applies equally to other processes and compositions requiring a reversible thickening step and/or post-curing shrinkage resistance.

EXAMPLE 3

An SMC formulation was prepared using a uracrylate resin as in Example 1 as base resin and a saturated polyamide wax (PAW) as additive resin with an estimated solubility parameter ($\delta$) of 24 MPa$^{1/2}$ which, is towards the edge of the preferred range from that of the base resin ($\delta$=20.7). Table 4 gives the proportions used.

TABLE 4

| Material | % by weight |
| --- | --- |
| URACRYLATE-METHYLMETHACRYLATE | 22 |
| FILLER (HYDROCARB) | 36 |
| TRIGONOX | .8 |
| ZINC STEARATE | 1.2 |
| PAW | 15 |
| GLASS MAT | 25 |

The resulting sheets were generally similar in mechanical behaviour to those formed from the composition listed in column (c) on Table 2 (Example 1) where the quantity of additive resin is much the same. Taking examples 1 and 3 together it can be seen that the invention is effective at both ends of the preferred, solubility parameter range ($\Delta\delta$).

We claim:

1. A thickened organic polymeric molding composition from which is absent an inorganic thickener selected from metal oxides and hydroxides and which said composition comprises a cooled mixture of:

a cross-linkable base resin dissolved in an unsaturated monomer; and as a thickener and shrinkage control agent, an additive resin having a minimum of 8 and a maximum of 40 repeating units and selected from saturated polyesters and saturated amide waxes; said additive resin being crystalline at ambient temperature and having a melting point ($T_m$) below a temperature ($T_c$) at which the base resin cross-linking reaction proceeds at a significant rate; said additive resin and said base resin having a solubility parameter difference therebetween in the range 1 to 3.5 MPa$^{1/2}$, whereby said additive resin is only partially compatible with the base resin;

said partial degree of compatibility allowing crystallization of said additive in said mixture upon cooling from a temperature between $T_m$ and $T_c$ to a temperature between $T_m$ and ambient;

whereby, (a) due to said cooling of said mixture from a temperature between $T_m$ and $T_c$ to a temperature below $T_m$ to produce said cooled mixture, said additive resin is in the form of crystals thereof distributed throughout the mixture, said crystallization thereby rendering the mixture thickened in the absence of a thickener selected from metal oxides and hydroxides; and (b) when the mixture is heated to a temperature above $T_m$, said mixture is capable of melting and reversibly breaking down to enable said additive resin, in a molten state, to render the composition capable of shrinkage control during molding.

2. A composition as claimed in claim 1 wherein the solubility parameter difference is in the range 1.0 to 2.5 MPa$^{1/2}$.

3. A composition as claimed in claim 1 wherein the base resin is an unsaturated polyester resin.

4. A composition as claimed in claim 3 wherein the monomeric solvent for the resin is a vinyl monomer.

5. A composition as claimed in claim 1 wherein the vinyl monomer is styrene.

6. A composition as claimed in claim 1 wherein the additive resin is a saturated polyester.

7. A composition as claimed in claim 6 wherein the polyester is polyethylene adipate or polyhexamethylene adipate.

8. The composition of claim 1 wherein the additive resin has a number average molecular weight of from about 1500 to about 3000.

9. The composition of claim 8, wherein the additive resin has a number average molecular weight of about 2000.

10. A composition as claimed in claim 1 wherein the amount of additive resin is 20 to 40% by weight of the base resin.

11. A composition as claimed in claim 1 comprising a free radical catalyst.

12. A composition as claimed in claim 1 comprising reinforcement.

13. A sheet moulding compound comprised of a composition as claimed in claim 12.

14. A granular moulding compound which comprises granules of a composition as claimed in claim 12.

15. A moulding compound comprised of a dough with a composition as claimed in claim 12.

16. A molded article produced from a cooled thickened organic polymeric composition capable of resisting post-molding shrinkage after being cross-linked, the thickened composition having absent therefrom an inorganic thickening agent selected from metal oxides and hydroxides and comprising:

a cross-linkable base resin dissolved in an unsaturated monomer; and as a thickener and shrinkage control agent, an additive resin having a minimum of 8 and a maximum of 40 repeating units selected from the group consisting of saturated polyesters and saturated amide waxes, said additive resin being crystalline at ambient temperatures and having a melting point ($T_m$) below a temperature ($T_c$) at which the base resin cross-linking reaction proceeds at a significant rate;

wherein the base resin and additive resin have a solubility parameter difference therebetween in the range of 1 to 3.5 $MPa^{1/2}$ whereby the base resin and additive resin have only a partial degree of compatibility, thereby allowing crystallization of said additive resin in said mixture, whereby said composition, having cooled from a temperature between $T_m$ and $T_c$ to a temperature between $T_m$ and ambient, has crystals of said additive resin distributed throughout so as to be thickened thereby, even in the absence of the thickener selected from metal oxides and hydroxides, and whereby, due to melting of the additive resin, the composition may be reversibly broken down by heating to a temperature below $T_c$.

* * * * *